United States Patent
Bhatia et al.

(10) Patent No.: US 11,430,119 B2
(45) Date of Patent: Aug. 30, 2022

(54) SPATIAL DISTRIBUTION OF PATHOLOGICAL IMAGE PATTERNS IN 3D IMAGE DATA

(71) Applicant: Siemens Healthcare GmbH, Erlangen (DE)

(72) Inventors: Parmeet Singh Bhatia, Paoli, PA (US); Gerardo Hermosillo Valadez, West Chester, PA (US); Yoshihisa Shinagawa, Downingtown, PA (US); Ke Zeng, Bryn Mawr, PA (US)

(73) Assignee: Siemens Healthcare GmbH, Erlangen (DE)

(*) Notice: Subject to any disclaimer, the term of this patent is extended or adjusted under 35 U.S.C. 154(b) by 36 days.

(21) Appl. No.: 17/017,914

(22) Filed: Sep. 11, 2020

(65) Prior Publication Data

US 2021/0090257 A1  Mar. 25, 2021

(30) Foreign Application Priority Data

Sep. 19, 2019 (EP) .................................. 19198197

(51) Int. Cl.
*G06T 7/00* (2017.01)
*G06T 7/11* (2017.01)
(Continued)

(52) U.S. Cl.
CPC .......... *G06T 7/0014* (2013.01); *G06K 9/6215* (2013.01); *G06T 7/11* (2017.01);
(Continued)

(58) Field of Classification Search
CPC ......... G06T 2207/30004; G06T 11/001; G06T 7/11; G06T 7/0014; G06K 9/6215; G06K 9/46; G06K 9/3233
See application file for complete search history.

(56) References Cited

U.S. PATENT DOCUMENTS 9,092,691 B1   7/2015 Beaumont et al.
9,128,530 B2 * 9/2015 Yin ........................ G06T 7/194
(Continued)

FOREIGN PATENT DOCUMENTS

EP          3611733 A1    2/2020
WO      WO-0225588 A2    3/2002

OTHER PUBLICATIONS

Hamilton, Nicholas A. et al. "Fast automated cell phenotype image classification", BMC Bioinformatics, vol. 8, No. 110, 2007 // DOI: 10.1186/1471-2105-8-110.
(Continued)

*Primary Examiner* — Mia M Thomas
(74) *Attorney, Agent, or Firm* — Harness, Dickey & Pierce, P.L.C.

(57) ABSTRACT

A method and for quantifying a three-dimensional medical image volume are provided. An embodiment of the method includes: providing a two-dimensional representation image based on the medical image volume; defining a region of interest in the two-dimensional representation image; generating a feature signature for the region of interest; defining a plurality of two-dimensional image patches in the medical image volume; calculating, for each of the image patches, a degree of similarity between the region of interest and the respective image patch on the basis of the feature signature; visualizing the degrees of similarities.

19 Claims, 2 Drawing Sheets

(51) Int. Cl.
  *G06K 9/62* (2022.01)
  *G06T 11/00* (2006.01)
  *G06V 10/25* (2022.01)
  *G06V 10/40* (2022.01)

(52) U.S. Cl.
  CPC ............ *G06T 11/001* (2013.01); *G06V 10/25* (2022.01); *G06V 10/40* (2022.01); *G06T 2207/30004* (2013.01)

(56) References Cited

U.S. PATENT DOCUMENTS

| | | | |
|---|---|---|---|
| 9,767,557 B1 | 9/2017 | Gulsun et al. | |
| 9,928,601 B2* | 3/2018 | Aarabi | H04N 1/628 |
| 2003/0013951 A1 | 1/2003 | Stefanescu et al. | |
| 2007/0165921 A1* | 7/2007 | Agam | G06T 7/0012 |
| | | | 382/128 |
| 2007/0297561 A1* | 12/2007 | Breeuwer | G06T 7/12 |
| | | | 382/169 |
| 2009/0190815 A1* | 7/2009 | Dam | A61B 5/4514 |
| | | | 382/128 |
| 2011/0026793 A1* | 2/2011 | Goel | G06T 7/60 |
| | | | 382/131 |
| 2011/0211743 A1* | 9/2011 | Avila | G06T 7/11 |
| | | | 382/131 |
| 2014/0233826 A1* | 8/2014 | Agaian | G06V 20/698 |
| | | | 382/133 |
| 2015/0287183 A1* | 10/2015 | Kang | G06V 10/443 |
| | | | 382/128 |
| 2016/0154993 A1* | 6/2016 | Aarabi | H04N 1/4074 |
| | | | 382/118 |
| 2017/0258433 A1* | 9/2017 | Gulsun | A61B 6/5217 |
| 2017/0278243 A1* | 9/2017 | Kang | G06T 17/005 |
| 2018/0240235 A1* | 8/2018 | Mazo | G06N 3/04 |
| 2019/0087532 A1* | 3/2019 | Madabhushi | G06T 7/0012 |
| 2020/0058390 A1 | 2/2020 | Kohle et al. | |
| 2020/0261297 A1* | 8/2020 | Strydom | G06T 7/60 |
| 2020/0402231 A1* | 12/2020 | Jhiang | G06T 7/30 |
| 2021/0049743 A1* | 2/2021 | Litwiller | G06T 7/0012 |
| 2021/0142470 A1* | 5/2021 | Meng | G06N 20/00 |
| 2021/0142475 A1* | 5/2021 | Li | G06T 7/194 |

OTHER PUBLICATIONS

Guo, Zhenhua et al. "A Completed Modeling of Local Binary Pattern Operator for Texture Classification" IEEE Transactions on Image Processing, vol. 19, No. 6. pp. 1657-1663, 2010 // DOI: 10.1109/TIP.2010.2044957.

* cited by examiner

SPATIAL DISTRIBUTION OF PATHOLOGICAL IMAGE PATTERNS IN 3D IMAGE DATA

PRIORITY STATEMENT

The present application hereby claims priority under 35 U.S.C. § 119 to European patent application number EP19198197.6 filed Sep. 19, 2019, the entire contents of which are hereby incorporated herein by reference.

FIELD

Embodiments of the present invention generally relate to, but not exclusively to, computer-implemented systems, methods and computer program usable in facilitating the reading of medical image data.

BACKGROUND

For all diagnostic radiology methods (which include mammography, conventional X-ray, CT, MRI), the identification, segmentation, and classification of abnormalities and/or findings are important steps in the diagnostic workflow. Such abnormalities or lesions, which may comprise cancerous growths, masses, abscesses, lacerations, calcifications, and/or other irregularities within biological tissue, can cause serious medical problems if left undetected.

In this regard, the spatial distribution of abnormalities, in particular, is an objective measure for generating medical diagnosis as the anatomic location of abnormalities and their relation to other anatomic structures may have profound implications on final diagnostic results.

In daily work, such kind of diagnosis is based on visual evaluation of anatomical structures in radiology image volumes.

SUMMARY

Unfortunately, the procedure of analyzing radiology images is often challenging. For arriving at an assessment regarding the spatial distribution of a disease pattern, the user must scroll through the individual slices of the medical image volume. Moreover, the density and tissue type of organs are highly varied and in turn present a high variety of visual features. Additionally, background visual patterns can obscure the early signs of malignancies which may then be easily overlooked by the human eye.

Therefore, the manual classification of the spatial distribution of abnormalities or patterns inevitably leads to errors owing to mistakes, human error, and/or details too fine for the human eye to detect. Thus, the analysis of medical images may lead to false negatives which may cause missed treatment or corrupted quantitative data. Likewise, the evaluation may prompt false positives which may cause unwanted psychological and sub-optimal downstream diagnostic and treatment consequences.

Besides possible classification errors, other drawbacks include time-consumption due to the labor-intensive manual screening and unnecessary additional costs if the uncertainty of the visual inspection triggers additional evaluations. What is more, the reliable detection of abnormalities and/or features in medical images often requires highly experienced physicians further increasing their workload. Moreover, the human component in evaluating image data adds a degree of subjectivity which is often unwanted.

Embodiments of the present invention provide a computer-aided diagnosis tool which supports a user/physician/radiologist/pathologist in deriving a medical diagnosis from medical image volume. Particularly, embodiments of the present invention assist in medical diagnosis by providing a process for quantifying medical image volumes in terms of image features contained in the medical image volumes.

Embodiments of the present invention are directed to a computer-implemented method for quantifying medical image volumes, a corresponding system, a corresponding computer-program product and a computer-readable storage medium. Alternative embodiments are object of the claims.

In the following, the technical solution according to the embodiments of present invention is described with respect to the apparatuses as well as with respect to the methods. Features, effects or alternative embodiments described herein can likewise be assigned to other objects and vice versa. In other words, claims addressing embodiments of the inventive method can be improved by features described or claimed with respect to the apparatuses. In this case, e.g., functional features of the method are embodied by objective units or elements of the apparatus.

According to an embodiment, a method for quantifying a three-dimensional medical image volume comprises:
providing a two-dimensional representation image based on the medical image volume,
defining a region of interest in the two-dimensional representation image,
generating a feature signature for the region of interest,
defining a plurality of two-dimensional image patches in the medical image volume,
calculating, for each of the image patches, a degree of similarity between the region of interest and the respective image patch on the basis of the feature signature, and
visualizing the degrees of similarities.

According to a second embodiment, a method for quantifying a three-dimensional medical image volume comprises:
providing a two-dimensional representation image based on the medical image volume,
defining a region of interest in the two-dimensional representation image,
generating a feature signature for the region of interest,
three-dimensionally sectioning the medical image volume into a plurality of two-dimensional image patches,
generating a three-dimensional similarity matrix by calculating, for each of the two-dimensional image patches, a degree of similarity between the respective two-dimensional image patch and the region of interest on the basis of the feature signature of the region of interest, and
generating a visualization on the basis of the degrees of similarity.

According to another embodiment, a system for quantifying a three-dimensional medical image volume, comprises: an interface configured to
provide a two-dimensional representation image based on the medical image volume, and
at least one processor configured to
define a region of interest in the two-dimensional representation image,
generate a feature signature for the region of interest,
define a plurality of two-dimensional image patches in the medical image volume,
calculate, for each of the image patches, a degree of similarity between the region of interest and the respective image patches on the basis of the feature signature, and visualize the degrees of similarities.

According to another embodiment, a non-transitory computer program product stores program elements to configure a processor of a system to quantify a three-dimensional medical image volume by performing the method of an embodiment, when the program elements are loaded into a memory of the processor and executed by the processor.

According to another embodiment, a non-transitory computer-readable medium stores program elements, readable and executable by a processor of a system for quantifying a three-dimensional medical image volume, to perform the method of an embodiment when the program elements are executed by the processor.

BRIEF DESCRIPTION OF THE DRAWINGS

Characteristics, features and effects of the above described invention, as well as the manner they are achieved, become clearer and more understandable in the light of the following description and embodiments, which will be described in detail with respect to the figures. This following description does not limit the invention on the contained embodiments. Same components or parts can be labeled with the same reference signs in different figures. In general, the figures are not drawn to scale. In the following.

DETAILED DESCRIPTION OF THE EXAMPLE EMBODIMENTS

Figure 1:
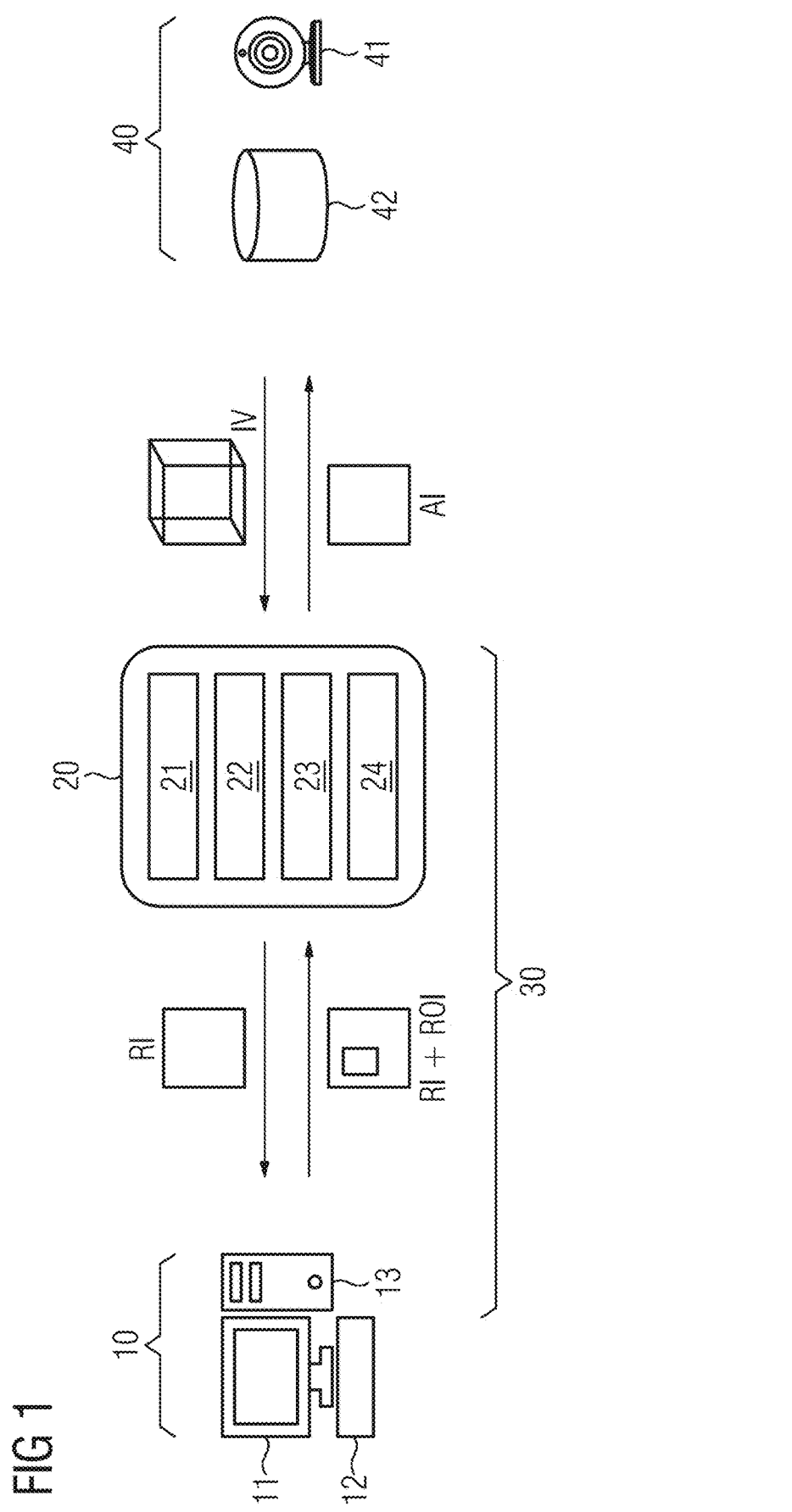
FIG. 1 depicts a system for quantifying medical images according to an embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, at least one processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including at least one processor and/or processing circuitry). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CDROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Accordingly, a first embodiment of the present invention is directed to a method for quantifying a three-dimensional medical image volume. The method comprises numerous steps.

A first step is directed to provide a two-dimensional representation image based on the medical image volume. A second step is directed to define a region of interest in the representation image. A further step is directed to generate a feature signature for the region of interest. A further step is directed to define a plurality of two-dimensional image patches in the medical image volume. A further step is directed to calculate, for each of the image patches, a degree of similarity between the region of interest and the respective image patches on the basis of the feature signature. Yet, a further step is directed to visualize the degrees of similarities.

In other words, an embodiment of the present invention to provides an interactive medical image analysis and visualization tool that allows a user to select an image pattern of interest from a medical image volume, automatically calculates the spatial distribution of the chosen pattern across the entire image volume, and presents a visual rendering of this spatial distribution to assist the user in making diagnostic decisions.

The medical image volumes relate to three-dimensional data sets either providing two dimensions in space and an additional dimension in time or three dimensions in space. The medical image volume may depict a body part of a patient in the sense that it contains three-dimensional image data of a patient's body part. Such medical data volumes may be acquired using a medical imaging modality. A medical imaging modality corresponds to a system used to generate or produce medical images. For example, a medical imaging modality may be a computed tomography system, a magnetic resonance system, an angiography (or C-arm X-ray) system, a positron-emission tomography system or the like. Specifically, computed tomography (CT) is a widely used imaging method and makes use of "hard" X-rays produced and detected by a specially rotating instrument. The resulting attenuation data (also referred to as raw data) is presented by a computed analytic software producing detailed images of the internal structure of the patient's body parts. The produced sets of images are called CT-scans which may constitute multiple series of sequential images to present the internal anatomical structures in cross sections perpendicular to the axis of the human body. Magnetic Resonance Imaging (MRI), to provide another example, is an advanced medical imaging technique which makes use of the effect magnetic field impacts on movements of protons. In MRI machines, the detectors are antennas and the signals are analyzed by a computer creating detailed images of the internal structures in any section of the human body. Accordingly, the medical image volume may comprise a stack or series of predefined sequential images (cross-sections). Commonly, the sequential images may all have the same size. However, the medical image volume may as well relate to an isotropic or isometric image volume lacking defined cross-sectional or sequential images. Cross-sectional images may, in this case, be generated by synthesized sections through the medical image volume in arbitrary angles. In general, the three-dimensional image volume as introduced above may be a three-dimensional array of pixels or voxels. Accordingly, two-dimensional image patches or images (such as the representation image) relate to two-dimensional arrays of pixels. Cross-sectional images as well as sequential images may, in principle, be oriented in arbitrary directions within the medical image volume and not just parallel or perpendicular to the body axes or the main axes of the medical image volume, for instance.

In general, the medical image volume may depict a body part of a patient. Thus, also the sequential images or any other arbitrary slice of the medical image volume depict sections of the body part.

Since three-dimensional arrays cannot be visualized on a two-dimensional screen or display, for instance, as one of the first steps, a two-dimensional representation image of the medical image volume is provided for further processing by the user. If the medical image volume comprises a stack of sequential images, the representation image may relate to one of the sequential images form the medical image volume. Otherwise (or in addition to that), the representation image may be provided as arbitrary slice (or section) through the medical image volume. Alternatively, the representation image may also be provided as a projection of the medical image volume on a given two-dimensional image plane, such as one of the sides of the medical image volume. Given that the medical image volume may depict a body part of a patient, also the representation image may depict a body part of a patient and, in particular, a cross-section through a body part of a patient.

The generated representation image is used to define a region of interest. A region of interest is to be understood as a group of image elements like pixels or voxels within the representation image. The region of interest comprises at least one, but optionally numerous image elements of the representation image. The defining of the region of interest may be based on identifying an anatomical feature in the representation image wherein the anatomical feature is indicative of a pathological condition of a patient. The region of interest may be defined by a user or semi-automatically or automatically by the computer-implemented method. The region of interest represents an area within the depicted body part of the patient, which is of specific interest for the radiologist analyzing the medical image volume. For example, the region of interest is positioned such that it comprises or covers a suspicious or atypical anatomical structure like a lesion or a calcification or the like. Optionally, the region of interest covers additional neighboring tissue representing unsuspicious areas for providing additional contextual information. A region of interest also covering not only a lesion but also surrounding tissue may later serve for realistic Hounsfield-like grayscale normalization of the representation image or only the region of interest. The region of interest may have an arbitrary shape, optionally the region of interest is of circular or quadratic form.

Optionally, not only one region of interest, but two or more regions of interest are defined. The plurality of regions of interest do not necessarily neighbor each other. For example, in case the representation image depicts more than one pathology or pattern, they can be considered for later examination. If the same pattern is addressed by more than one region of interest, the respectively extracted feature signatures may be averaged.

Alternatively, the region of interest may be defined by the representation image as such (i.e., by providing the representation image). Thus, both these steps may be combined thereby reducing image data amount and necessary computational power involved in the subsequent steps.

The region of interest is then analyzed for visual characteristics. In this step, a feature signature is generated for the region of interest. The feature signature optionally comprises not only one, but numerous features which, as a sum, characterize the analyzed region of interest. The generated feature signature may comprise an anatomical feature and/or structure, like, e.g., the presence of a landmark or the size of an organ or the structure, texture and/or density of an identified tissue or organ. The feature signature may likewise comprise a parameter characterizing a color and/or grey scale scheme, or contrast characteristics, or local gray scale gradients present in the analyzed image, optionally in the defined region of interest. However, the identified feature signature may further comprise a parameter indicative of information as regards the surrounding of the current region of interest. The feature signature may be provided in the form of a feature vector combining several individual feature characteristics. Now that the feature signature has been extracted, the next steps are devoted to calculating the spatial distribution of the feature signature in the medical image volume.

To this end, the medical image volume is partitioned into regions (subsequently also denoted as "image patches") that can be readily compared to the region of interest. Specifically, a plurality of two-dimensional image patches is defined in the medical image volume. In order to obtain a three-dimensional spatial distribution of the pattern of interest, the image patches are optionally three-dimensionally distributed in the medical image volume as well. In other words, the medical image volume may be three-dimensionally sectioned into a plurality of two-dimensional image patches so that the image patches three-dimensionally span the medical image volume. Image patches may, in principle, be oriented in arbitrary directions with respect to the representation image. Optionally, the image patches are plane-parallel to the representation image.

Based on the feature signature of the region of interest, a degree of similarity is calculated for each image patch. In this regard, the respective feature signatures of the image patch and the region of interest may be compared to each other. For example, each individual feature contributing to the feature signature may be individually compared. Alternatively, comparison is based on a condensed feature parameter which is based on the plurality of individual features contributing to the feature signature. The degree of similarity is indicative of the similarity of respective image patch to the region of interest. In other words, the degree of similarity can be seen as a distance and/or difference measure of the feature signatures compared.

Since the image patches optionally span the medical image volume in three dimensions, the same holds true for the degrees of similarity—as they are calculated for each of the image patches. Mathematically, the degrees of similarity may then be conceived as three-dimensional array. This array (at least approximately) conforms to or spans the medical image volume. In other words, the image patches are defined such that the degrees of similarity are arranged in a three-dimensional array spanning the medical image volume. In any case, the ensemble of degrees of similarity is an quantitative measure for the spatial or three-dimensional distribution of the feature or pattern contained in the region of interest in the medical image volume. The individual degrees of similarity are a measure for the (image-) similarity of the corresponding image patch to the (feature signature of the) region of interest. High values for the degree of similarity may indicate a high similarity whereas low values stand for a low similarity.

Of note, the step of defining the image patches and the step of calculating the feature signatures do not need to be performed sequentially in the sense that first all image patches are defined (and stored) and then the degrees of similarity are calculated. Rather, the degree of similarity of a given image patch may be calculated once the image patch has been defined. This has the benefit that the image patches as such do not have to be buffered and only the degrees of similarity are recorded. Such procedure is explicitly included in the scope of the claims since this still involves the definition of all of the image patches at some point.

The degrees of similarity may be integers, floating point numbers or even Boolean variables (e.g., similarity present vs. similarity not present). In the step of visualizing, the values are translated or converted into a representation that can be readily assessed by the human eye, for instance. In other words, a visualization (a viewable representation) is generated (calculated) based on the calculated degrees of similarity. To this end, the degrees of similarities may be normalized, e.g., with respect to the highest degree of similarity calculated. The step of visualizing may further comprise a step of interpolating between the degrees of similarity in order to get a larger data base for visualization. Further, the step of visualization may comprise a step of smoothing the degrees of similarity in order to allow for a more homogenous visualization.

In summary, in other words, a computer-implemented method for quantifying a three-dimensional medical image volume is provided comprising the following steps: providing a two-dimensional representation image based on the medical image volume, defining a region of interest in the representation image, generating a feature signature for the region of interest, three-dimensionally sectioning the medical image volume into a plurality of two-dimensional image patches, generating a three-dimensional similarity matrix by calculating, for each image patch, a degree of similarity between the respective image patch and the region of interest on the basis of the feature signature of the region of interest, and visualizing the similarity matrix.

Taking all this together, the outlined method steps may contribute to an interactive method for quantifying a medical image volume by producing the spatial distribution of an individually selectable feature. With that, the proposed method supports a user in providing a medical diagnosis related to the spatial distribution of a disease pattern by automatically processing physiological measurements in the form of a medical image volume. By providing a two-dimensional representation image for visual inspection, by allowing to custom-define the region of interest and by visualizing the result of the computation, the method is specifically adapted to interact with a user. This enables the method to be adapted to the medical image volume under consideration, the current pattern of interest, and the needs of the user. In contrast to other approaches used to date which are often specifically configured to recognize one particular sort of pattern, the method is more flexible as the definition of a region of interest is, in principle, applicable for any pattern. Of note, also the calculation of the degrees of similarity via the region of interest's feature signature and the segmentation of the medical image volume into image patches contribute to optimally support the user when providing a medical diagnosis. This is because these steps allow for a comparatively swift computation which in turn enables the user to review the computation results without significant time delay and parameter adjustments in quasi real time. Moreover, the step of visualizing the degrees of similarity allows the user to inspect the calculation result at "one glimpse" instead of having to scroll through the image volume on his or her own.

According to an embodiment, the medical image volume comprises a stack of two-dimensional sequential images.

By considering medical image volumes comprising a stack of two-dimensional sequential images, such as MR-scan of a human brain, for instance, the method makes allowance for image volumes commonly used in medical imaging. With that, the method has a broad scope of application when it comes to assist users upon formulating a medical diagnosis. As indicated previously, the sequential images may relate to a series of defined cross sections through an imaging volume, which may, for instance, be generated automatically in magnetic resonance or computed tomography imaging.

According to an embodiment, the step of providing comprises selecting one of the sequential images as representation image. Thereby, the step of selecting may be performed by the user or semi-automatically or automatically by the system depending on how much assistance the user needs. Further, the step of defining a plurality of image patches comprises defining a plurality of image patches in each of the sequential images.

By resorting to sequential images in the medical image volume when providing the representation image and defining the image patches, a computationally efficient implementation is realized. This is because, with the sequential images, the method may thus make use of structures anyway present in the medical image volume such as MR or CT scans. Further, the usage of the sequential images provides a very intuitive access for the user since she or he is already used to the concept of stacked sequential images. Accordingly, she or he may conveniently select the representation image by scrolling through the image stack. In addition to that, applying the definition of the two-dimensional image patches on the level of the sequential images by definition generates a very even three-dimensional distribution of the image patches throughout the medical image volume. Since the distribution of image patches in the medical image volume determines the distribution of the degrees of similarity, this entails a meaningful readout for the entire medical image volume and the degrees of similarity can be readily visualized. The three-dimensional array of the degrees of similarity may then be seen as comprising layers of degrees of similarities, each layer corresponding to one of the sequential images.

According to an embodiment, the representation image is provided by defining (computing) a first slice through the medical image volume. Further, the first slice may be arbitrarily selected by the user, e.g., by interactively defining a section through the medical image volume.

With that the user is given more freedom to select the representation image. For instance, he or she may focus on the part of the medical image volume that empirically provides a good readout as regards potential lesions/abnormalities/patterns.

Further, according to an embodiment, the step of defining a plurality of image patches may comprise computing a plurality of second slices through the medical image volume in parallel to the first slice, and defining a plurality of image patches in the first slice and each of the second slices, respectively. Optionally, the first and second slices may be arranged such that they are equidistant in a direction perpendicular to the first slice.

By defining the second slices based on the first slice, the image volume is partitioned for further processing (i.e., for calculating the degrees of similarity). This provides a reasonable distribution of the image patches throughout the medical image volume and thus gives a reasonable readout for the spatial distribution of the features of the region of interest in the medical image volume.

Likewise, the step of visualizing may comprise defining (computing) an imaging slice through the image volume, identifying the degrees of similarity corresponding to the imaging slice, and visualizing the degrees of similarity corresponding to the imaging slice. The imaging slice may be arbitrarily selected by the user, e.g., by interactively defining a section through the medical image volume. Identifying the degrees of similarity corresponding to the imaging slice may comprise identifying the degrees of similarity in the vicinity of the imaging slice, i.e., the degrees of similarity of image patches located at a predetermined distance from the imaging slice. In this regard, the predetermined distance may, for instance, relate to a normal of the imaging slice to the midpoint of the image patch. Thus, in other words, all image patches are considered, which are located in a given volume around the imaging slice.

By choosing an imaging slice through the medical image volume, the spatial distribution of a pattern in a specific region in the image volume can be retrieved, which may, for instance, be beneficial for certain medical diagnosis. This enables the reliable assessment of the anatomic location of lesions/abnormalities/patterns and their relation to other anatomic structures. The imaging slice may, for instance, run perpendicular to the stacked sequential images the first and second slices optionally used to define the region of interest and the image patches. Alternatively, any other orientation of the imaging slice may be adopted. For instance, the slice may follow a body part of a patient. Of note, the imaging slice does not have to be a plane either. Rather, the user may choose an appropriate topology.

According to an embodiment, in the step of defining the plurality of image patches, the size of the image patches is defined on the basis of the size of the region of interest.

In other words, the image patches are defined according to the pattern of interest contained in the region of interest. With that the images patches are adapted to the feature for which the spatial distribution is sought. On the one hand, this improves the significance of the calculation. On the other hand, this enables a reasonable resolution for visualizing the spatial distribution via the degrees of similarity. Optionally, the size of the image patches is defined such that the image patches are of approximately the same size (and, optionally, shape) as the region of interest or a bounding box around the region of interest.

According to an embodiment, the step of defining the plurality of image patches is performed using a sliding window method or an overlapping sliding window method.

In the sliding window approach, a window "slides" over an image (e.g., the representation image and/or the first/second slices and/or the sequential images) for dividing it into patches. Every slide, the window is moved a specific number of pixels to the side, which is also called "the stride". The stride may be such that subsequent image patches may comprise some overlap with the previous image patches. Optionally, the size of the window is adjusted based on the size of the region of interest, e.g., such that the window has approximately the same size as the region of interest.

The usage of a sliding window algorithm for defining the patches may have the effect, that the image patches can be sequentially defined in the sense that a new image patch may be only defined once the degree of similarity of the preceding patch has been calculated. Moreover, the sliding window method is efficient form a computational point of view. The use of an overlapping sliding window method enables to more readily capture individual structures in the medical image volume. This is because it is usually unlikely that patterns in an image volume conform to a fixed grid of image patches. This might have the consequences that patterns may be cut by the image patches adversely affecting the calculation result (i.e., the degree of similarity). By using an overlapping sliding window approach, a form of a mean calculation is applied across a plurality of image patches partially mitigating such finite size effects. Moreover, the resolution of the degrees of similarity with respect to the medical image volume is enhanced.

As an alternative, the image patches may be defined by applying a grid to the representation image and/or the second slices and/or the sequential images which likewise allows for a computationally fast and scalable way of partitioning the image volume into image patches. Optionally, the size of the grid is adjusted based on the size of the region of interest, e.g., such that the grid tiles have approximately the same size (and, optionally, shape) as the region of interest.

According to an embodiment, the step of calculating a degree of similarity comprises, for each image patch, generating a feature signature of the respective image patch and comparing it to the feature signature of the region of interest.

Generating the feature signatures for the image patches has the benefit that a reproducible quantitative measure is used for calculating the degrees of similarity. Optionally, the feature signature for the image patches has the same format as the feature signature of the region of interest. To give an example, this may mean that the feature signatures of the image patches and the features signature of the region of interest are both n-dimensional feature vectors. Using the same format for the feature signatures of the region of interest and the image patches may have the effect that the feature signatures can be readily compared for calculating the degrees of similarity. In this respect, it is furthermore possible that the same algorithms are used for calculating the feature signatures of the image patches and the features signatures of the region of interest. This further increases the comparability and decreases the effort for implementing the method.

According to an embodiment, the step of visualizing comprises generating a two-dimensional rendering on the basis of the degrees of similarity.

The visualization may comprise displaying the two-dimensional rendering to the user. The two-dimensional rendering is configured such that it provides a visual indication of the degrees of similarity to the user and therewith of the spatial distribution of the pattern of interest. The two-dimensional rendering may, in general, rely on known rendering procedures, such as ray-casting, raytracing, texture-rendering or the like. The generation of a two-dimensional rendering (subsequently also denoted as "assistance image") may have the effect that the result of the computation can be readily displayed and assessed on a displaying device. The term "on the basis of" in this context means that the degrees of similarity form the basis for the visualization. This may signify that the degrees of similarity are visualized directly by converting them to image pixels. The degree of similarity may further be encoded in brightness, color, and/or intensity. Alternatively, the degrees of similarity may be combined with other image data for generating the two-dimensional rendering. For instance, the degrees of similarity may be combined with the image data of the medical image volume. In this regard, the degrees of similarity could also be used as (translated into) texture information for generating a two-dimensional rendering of the medical image volume.

Noteworthy, besides generating a two-dimensional rendering, other methods for displaying the degrees of similarity are also possible. For instance, a three-dimensional holographic representation of the degrees of similarity might be generated.

According to an embodiment, the step of visualizing comprises: generating a semi-transparent two-dimensional rendering on the basis of the degrees of similarity, and overlaying the two-dimensional rendering on the basis of the degrees of similarity over a corresponding two-dimensional rendering of the medical image volume.

"Corresponding" in this context may be interpreted such that two two-dimensional renderings conform to one another in the sense that both relate to the same view of the medical image volume. This may be equivalent with the notion that the two renderings have the same viewing angle and the same image size or, to put it in more general terms, have the same visualization parameters. The overlay in this context enables the user to readily connect the calculated spatial distribution with the underlying anatomical structures and therefore facilities the medical diagnosis.

According to an embodiment, the step of visualizing comprises interactively setting the visualization parameters by the user. In particular, this may comprise parameters for generating the two-dimensional rendering such as the viewing angle, shading, transparency, resolution and the like.

This enables the user to interactively customize the visualization according to his or her needs and according to the medical question at hand. As an alternative, the step of visualizing may be an (semi-)automatic step for users who need more assistance.

In addition to that or as an alternative, the step of visualizing may comprise interactively selecting the degrees of similarity for visualizing by the user. For instance, this may involve selecting one layer of the degrees of similarity, which layer may conform to a particular sequential image from the medical image volume or to a certain arbitrary cross-section through the medical image volume. Moreover, the user may "window" the degrees of similarity to constrict the visualization to a particular sub-volume of the medical image volume.

According to an embodiment, the step of visualizing further comprises comparing the degrees of similarity to a predetermined threshold and considering only degrees of similarity only above the threshold for visualizing the degrees of similarity.

The predetermined threshold may either be user defined or set automatically. Thresholding the degrees of similarity suppresses the noise in the visualization and thus makes the calculation result more readily accessible for the user.

According to an embodiment, the step of visualizing comprises generating a projection of the degrees of similarity onto the image plane of the representation image.

Since the degrees of similarity, in general, are a three-dimensional array, this may involve mapping or projecting three-dimensional data on a two-dimensional plane. To this end, a maximum intensity projection may be used, for instance. Employing a projection of the degrees of similarity onto the image plane of the representation image gives an intuitive readout about the distribution of region of interest-features in the other layers of the medical image volume.

The above steps pertaining to visualizing the degrees of similarity may thus generally comprise generating a two-dimensional assistance image on the basis of the degrees of similarity and displaying the assistance image (to the user). By using a two-dimensional assistance image, the result of the computation, i.e., the spatial distribution of the features from the region of interest, can be effectively visualized to the user on a two-dimensional screen or even as a printout, for instance. The assistance image may be subjected to a smoothing process, e.g., by interpolating between the degrees of similarity for smoothing the visualization. Alternatively, any other known smoothing step may be used. Applying a smoothing step has the effect that a more detailed (and more appealing) representation may be generated for the user which is, in turn, helpful for supporting the user in his or her assessment of the medical image volume.

According to an embodiment, the assistance-image is semi-transparent, and in the step of visualizing, the assistance image is overlaid over the representation image.

Using an overlay for visualizing the degrees of similarity, a user can readily draw a connection between the calculated degrees of similarity and the underlying anatomical structure in the medical image volume as displayed in the representation image.

According to an embodiment, the defining of the region of interest is carried out manually by a user.

This step can, e.g., be realized using a user interface. The representation may be displayed on a screen or display for region of interest definition. For this, there may be provided a graphical ROI (region of interest)-tool comprising a closed outer line, which may be superimposed to the displayed representation image and may be manipulated via a touch pad or electronic pen or other suitable devices of the user interface. Manipulation of the ROI-tool may comprise positioning within the representation image as well as changing the size and/or shape of the closed outer line to guarantee that a lesion is fully included in the thus defined region of interest. All image elements of the representation image covered by the ROI-tool belong to the region of interest for the following steps and are optionally considered for feature/object/lesion extraction and/or identification, on which the image comparison is based.

Allowing the user to select the region of interest provides an additional degree of flexibility to the method since this step enables to interactively adapt the method to various different patterns. In other words, the method is not statically devoted to particular kinds of patterns but is configured to dynamically interact with the user to generate a spatial distribution of a user-selected pattern. In doing so, the method optimally supports the user when developing a medical diagnosis.

As an alternative or in addition to that, the defining of the region of interest may be carried out automatically, based on the results of a lesion detection algorithm or semi-automatically. Here, the algorithm may suggest a region of interest based on the lesion detection or based on a default setting, which may then be manually adapted. To this end, the method may also rely on a database or library of patterns that have been deemed interesting in previous studies. Using a partial or fully automatic step of defining the region of interest, the region of interest covers relevant anatomical patterns or features.

According to an embodiment, the step of providing comprises selecting the representation image from the medical image volume manually by the user.

This may have the effect the user has more freedom when choosing the pattern of interest for further procedure. For instance, the user may scroll through the medical image volume until a particular pattern catches her or his attention. She or he may then define a region of interest around the pattern—thereby defining the current view (or the current examination image) of the medical image volume as the representation image.

As an alternative or in addition to that, the method may also be configured to auto-select the representation image or to make suggestions to the user as regards the representation image. Suggestion may be made based on user actions recorded in previous studies or by automatically identifying potentially interesting patterns. This has the benefit that the method better assists users that need more support.

According to an embodiment, the degrees of similarity span the medical image volume in three dimensions. In other words, the degrees of similarity are three-dimensionally distributed in the medical image volume. Accordingly, it is readily possible to visualize the spatial distribution of a particular pattern in the medical image volume. The degrees of similarity can be conceived as "similarity-voxels" indicating the degree of similarity to the pattern of the region of interest in the respective volume segment of the medical image volume. As such, the degrees of similarity are independent of the orientation of the image patches and the representation image in the three-dimensional space of the medical image volume.

According to an embodiment, the method further comprises the steps of generating a segmentation mask for the medical image volume and applying the segmentation mask in any of the steps of defining the plurality of two-dimensional image patches, and/or calculating the degree of similarity, and/or visualizing the degrees of similarities.

The segmentation mask may delineate a first segment of the medical image volume from a second segment of the medical image volume. While the first segment may relate to a body part under consideration for generating a medical diagnosis, the second segment may relate to parts of the medical image volume which are less or not at all relevant for the medical diagnosis. For instance, such situation may arise, when the spatial distribution of abnormalities in lung lobes has to be evaluated. Usually, the medical image volume will not only contain information (voxels) belonging to the lung lobes, but also to neighboring pathological structures such as the spine, ribs, or the heart. Including these structures in the calculation of the spatial feature distribution may have the disadvantage that the segments relevant for diagnosis may appear "masked" in the visualization. Moreover, including image segments in the calculation which are actually irrelevant is inefficient from a computational point of view. Therefore, the method may generate and apply a segmentation mask. Specifically, the segmentation mask may be applied in connection with three different method steps: in the step of defining the plurality of two-dimensional image patches, in the step of calculating the degree of similarity, and/or in the step of visualizing the degrees of similarities. Applying the segmentation mask already in the steps of the defining the image patches and/or of calculating the degrees of similarity has the benefit that the computational costs can be decreased. Moreover, since no irrelevant degrees of similarity are computed in the first place, the visualization is not impaired by these values. Alternatively, the segmentation mask may be applied in the step of visualizing only. Also in this case, distracting effects from outside of the segmentation mask may be discarded in the visualization. However, since all degrees of similarity are still calculated, this may provide the option to switch the segmentation mask on and off during visualization.

In particular, the segmentation mask may be applied in the step of defining the plurality of two-dimensional image patches so that image patches are only defined inside of the segmentation mask. This has the two-fold benefit that the computational costs for both the definition of the image patches as well as the subsequent calculation of the degrees of similarity can be reduced.

Moreover, the segmentation mask may be applied in the step of calculating the degrees of similarity so that degrees of similarity are only calculated for patches arranged inside of the segmentation mask. This may comprise that feature signatures are only calculated for patches inside of the segmentation mask. Hence, only relevant degrees of similarity are calculated which saves computing power. If the degrees of similarity are considered as three-dimensional array, values outside of the segmentation mask thus may stay void.

Further, the segmentation mask may be applied in the step of visualizing so that only degrees of similarity for image patches inside of the segmentation mask are considered for visualizing. This can be realized by either discarding voids in the array of degrees of similarity or not using similarity values for image patches outside of the segmentation mask, e.g., when generating the two-dimensional rendering. With that, the visualization is not obscured by irrelevant information stemming from image volumes currently not considered.

According to an embodiment, in the step of visualizing, the degrees of similarity may be visualized in the form of a color-code.

The usage of a color code provides an intuitive way of displaying the spatial distribution of the selected pattern to the user. The usage of color codes may comprise assigning a color gradient or color spectrum to the degrees of similarity so that high degrees of similarity correspond to colors from one end of the spectrum and low degrees of similarity correspond to colors from the other end of the spectrum, for instance. For example, the spatial distribution may thus be visualized in the form of a heatmap.

According to an embodiment, the step of generating the feature signature of the region of interest is performed using a trained machine-learning algorithm. The same algorithm may optionally be used for generating the feature signatures of the image patches.

Optionally, the trained machine-learning algorithm comprises a neural network, in particular a convolutional neural network. A neural net is basically built up like a biological neural net, e.g., a human brain. In particular, an artificial neural network comprises an input layer and an output layer. It may further comprise a plurality of layers between input and output layer. Each layer comprises at least one, optionally a plurality of nodes. Each node may be understood as a biological processing unit, e.g. a neuron. With other words, each neuron corresponds to an operation applied to input data. Nodes of one layer may be interconnected by edges or connections, in particular by directed edges or connections, to nodes of other layers. These edges or connections define the data flow between the nodes of the network. In particular, the edges or connections are equipped with a parameter, wherein the parameter is often denoted as "weight". This parameter can regulate the importance of the output of a first node to the input of a second node, wherein the first node and the second node are connected by an edge. In particular, a neural network can be trained. In particular, training of a neural network is performed based on known pairs of input and output values according to a 'supervised learning' technique, wherein the known input values are used as inputs of the neural network, and wherein the corresponding output value of the neural network is compared to the corresponding known output value. The artificial neural network independently learns and adapts the weights for the individual nodes as long as the output values of the last network layer sufficiently correspond to the known output values according to the trainings data. For convolutional neural networks, this technique is also called 'deep learning'. The terms 'neural network' and 'artificial neural network' can be used as synonyms. In particular, in the training phase, the convolutional neural network is trained to identify different optionally predefined types of disease patterns such as emphysema, honey combing, and ground grass opacity. Each disease pattern may be characterized by individual visual image features. Thus, during the training phase the neural network learns to classify the extracted feature signature to at least one of these disease patterns. During training, manual mapping of individual representation images to individual disease patterns may be applied. Optionally, upon comparing feature signatures the neuron activation value of the last but one layer of the neural network as the feature signature of the representation image may be used.

A first group of neural network layers may be applied to extract features from images (here: region of interests and/or image patches). In this case, image data, i.e. the gray scale and/or color values for each individual image element of the image, serve as input values for the neural network. The extracted features like, contrast, gradients, texture, density, or the like may be fed as input values to a second group of network layers, also known as classifiers, which serve to further assign objects and/or characteristics to at least one of the extracted features present in the image. However, both functions of the described neural network may likewise be carried out by separated, individual neural networks. With other words, image analysis for feature extraction can be carried by a first neural network, and classification, i.e. object and/or characteristic assignment can be carried out by a second neural network.

For further details with regard to the feature extraction using neural networks, reference is made to European Patent Application EP 18189090.6, the entire contents of which are incorporated by reference.

The usage of a trained machine-learning algorithm for extracting the feature signatures may have the effect that the method is applicable to a wide variety of image patterns.

According to an embodiment, the step of generating the feature signature (for the region of interest and/or the image patches) is performed using texture classification algorithms.

The usage of texture classification algorithms provides a comparatively fast way of extracting feature signatures which may be beneficial if large medical image volumes have to be analyzed or if the resolution of the image patches is high. Corresponding methods are, for instance, described in: Hamilton et al., "Fast automated cell phenotype image classification," BMC Bioinformatics, 8:110, 2007, DOI: 10.1186/1471-2105-8-110, and Guo et al., "A Completed Modeling of Local Binary Pattern Operator for Texture Classification," in IEEE Transactions on Image Processing, Vol. 19, No. 6, pp. 1657-1663, 2010, DOI: 10.1109/TIP.2010.2044957, the entire contents of each of which are incorporated by reference.

According to a further aspect, a system for quantifying a three-dimensional medical image volume is provided. The system comprises an interface configured to provide a representation image based on the medical image volume. The system further comprises a computing unit, configured to define a region of interest in the representation image, to generate a feature signature for the region of interest, to define a plurality of two-dimensional image patches in the medical image volume, to calculate, for each of the image patches, a degree of similarity between the region of interest and the respective image patch on the basis of the feature signature, and to visualize the degrees of similarities.

The interface may be understood as a device comprising a display screen such as a workstation or a mobile device. The interface may be configured to generate the representation image. It further comprises an interface for data exchange with a local server or a central web server via internet connection. The interface is further configured to receive a visualization of the degrees of similarity via the interface and to display the visualization via the display screen to the user.

According to an embodiment, the system is adapted to implement embodiments of the inventive method for quantifying the medical image volume. The computing unit may comprise a definition unit configured to define at least one region of interest in the representation image and a plurality of two-dimensional image patches in the medical image volume. The computing unit may further comprise a generation unit configured to generate a feature signature at least for the region of interest of the representation image, a comparison unit configured to compare the feature signature of the region of interest with (the feature signatures of) a plurality of two-dimensional image patches defined in the medical image volume, and a visualization unit configured to generate a visualization (for a user) on the basis of the degrees of similarity.

The computing unit can be realized as a data processing system or as a part of a data processing system. Such a data processing system can, for example, comprise a cloud-computing system, a computer network, a computer, a tablet computer, a smartphone and/or the like. The computing unit can comprise hardware and/or software. The hardware can be, for example, a processor system, a memory system and combinations thereof. The hardware can be configurable by the software and/or be operable by the software. Generally, all units, sub-units or modules may at least temporarily be in data exchange with each other, e.g., via a network connection or respective interfaces. Consequently, individual units may be located apart from each other, especially the definition unit may be located apart, i.e. at the mobile device/the user interface, from the remaining units of the computing units.

Another embodiment of the present invention is directed to a computer program product comprising program elements which induce a computing unit of a system for quantifying a medical image volume to perform the steps according to the above method, when the program elements are loaded into a memory of the computing unit.

Another embodiment of the present invention is directed to a computer-readable medium on which program elements are stored that are readable and executable by a computing unit of a system for quantifying a medical image volume, in order to perform steps of at least an embodiment of the inventive method, when the program elements are executed by the computing unit.

The realization of at least an embodiment of the invention by a computer program product and/or a computer-readable medium may have the effect that already existing providing systems can be easily adopted by software updates in order to work as proposed by at least an embodiment of the invention.

The computer program product can be, for example, a computer program or comprise another element next to the computer program as such. This other element can be hardware, e.g., a memory device, on which the computer program is stored, a hardware key for using the computer program and the like, and/or software, e.g., a documentation or a software key for using the computer program. The computer program product may further comprise development material, a runtime system and/or databases or libraries. The computer program product may be distributed among several computer instances.

In summary, at least an embodiment of the present invention provides an interactive medical image analysis and visualization method and system that that allows the user to view a medical image volume and to manually delineate regions that contain a pathological pattern of interest. On that basis an image descriptor is employed that transforms raw image intensities to numerical representations (feature signatures) suited for quantifying visual concepts. On that basis, a pattern matching algorithm identifies other regions (image patches) in the medical image volume which are visually similar to the chosen pattern of interest. The resulting detection results (the degrees of similarity) are then converted into a viewable object indicating the spatial distribution of the pathological pattern of interest (e.g., as a two-dimensional rendering of the detection results).

According to an embodiment the representation image is provided by computing a first slice through the medical image volume.

According to an embodiment the step of defining a plurality of image patches comprises: computing a plurality of second slices through the medical image volume in parallel to the first slice; and defining a plurality of image patches in the first slice and each of the second slices, respectively.

According to an embodiment, the image patches are defined such that the degrees of similarity are arranged in a three-dimensional array spanning the medical image volume.

According to an embodiment, the step of defining comprises defining the plurality of two-dimensional image patches in the medical image volume such that the image patches three-dimensionally span the medical image volume.

According to an embodiment, the step of visualizing comprises selecting a slice through the image volume, identifying the degrees of similarity corresponding to the slice, and visualizing the degrees of similarity corresponding to the slice.

According to an embodiment the step of visualizing comprises generating a two-dimensional assistance image on the basis of the degrees of similarity and displaying the assistance image.

According to an embodiment, the assistance image is subjected to a smoothing process.

According to an embodiment, the assistance-image is semi-transparent and, in the step of displaying, the assistance image is overlaid over the representation image.

According to an embodiment, the step of visualizing comprises interpolating between the degrees of similarity.

According to an embodiment, the defining of the region of interest is based on identifying an anatomical feature in the representation image, and wherein the anatomical feature is indicative of a pathological condition of a patient.

According to an embodiment, the method further comprises the step of comparing the degrees of similarity to a predetermined threshold, wherein, in the step of visualizing, only degrees of similarity above the threshold are visualized.

According to an embodiment, the method further comprises the steps of generating a segmentation mask for the medical image volume and applying the segmentation mask in the step of defining the plurality of two-dimensional image patches so that image patches are only defined inside the segmentation mask.

According to an embodiment, the method further comprises the steps of generating a segmentation mask for the medical image volume and applying the segmentation mask in the step of calculating the degree of similarity so that degrees of similarities are only calculated for image patches inside of the segmentation mask.

According to an embodiment, the method further comprises the steps of generating a segmentation mask for the medical image volume and applying the segmentation mask in the step of visualizing so that only degrees of similarity for image patches inside of the segmentation mask are considered for visualizing.

According to an embodiment, the step of calculating a degree of similarity comprises, for each image patch, generating a feature signature for each image patch and comparing it to the feature signature of the region of interest.

According to an embodiment, the step of generating the feature signature for the region of interest and the step of generating the feature signature for the plurality of image patches are performed using the same algorithm.

According to an embodiment, the medical image volume depicts a body part of a patient.

According to an embodiment, the step of generating is performed using a trained machine-learning algorithm.

According to an embodiment, the step of generating is performed using texture analysis algorithm.

According to an embodiment, the step of defining the plurality of image patches is performed using a sliding window method.

According to an embodiment, the step of defining the plurality of image patches is performed using an overlapping sliding window method.

FIG. 1 depicts a system 1 for quantifying a medical image volume IV according to an embodiment of the present invention. System 1 is adapted to perform the method according to one or more embodiments, e.g., as further described with reference to FIG. 2.

System 1 comprises a user interface 10 and a processing system 20. Further system 1 may comprise a medical image system 40 for acquiring, storing and/or forwarding medical image volumes IV.

The medical image volume IV is a three-dimensional image data set acquired, for instance, using a computed tomography system or a magnetic resonance imaging system. The medical image volume IV may comprise a stack of sequential two-dimensional (2D) individual images (in the following "sequential images" SI), which the user may scroll through when reviewing the medical image volume IV. The stack comprises a number of k sequential images SI and each sequential image SI may contain m times n pixels. Alternatively, the image volume may comprise an isotropic three-dimensional array without dedicated sequential images. The image information is then encoded in a three-dimensional array of k times m times n voxels. To review the medical image volume IV, the user may select an arbitrary slice through the medical image volume IV.

User interface 10 comprises a display unit 11 and an input unit 12. User interface 10 may be embodied by a mobile device such as a smartphone or tablet computer. Further, user interface 10 may be embodied as a workstation in the form of a desktop PC or laptop. Input unit 12 may be integrated in display unit 11, e.g., in the form of a touch screen. As an alternative or in addition to that, input unit 12 may comprise a keyboard, a mouse or a digital pen and any combination thereof. Display unit 11 is configured for displaying a representation image RI generated form the medical image volume IV and an associated assistance image AI. Further, user interface 10 may be configured for manually defining a region of interest ROI in the representation image RI.

User interface 10 further comprises an interface computing unit 13 (including at least one processor and/or processing circuitry) configured to execute at least one software component for serving display unit 11 and input unit 12 in order to provide a graphical user interface for defining the region of interest ROI by a user, and to display the representation image RI and/or the assistance image AI on display unit 11 and/or within the graphical user interface. In addition, interface computing unit 13 may be configured to communicate with medical image system 40 or processing system 20 for receiving the medical image volume IV and/or the representation image RI and/or the assistance image AI to be displayed to the user. Further, interface computing unit 13 may be configured for processing the manually input region of interest ROI together with the representation image RI and for communicating them to processing system 20 for further processing. The user may activate the software component via user interface 10 and may acquire the software component, e.g., by downloading it from an internet application store. According to an example, the software component may also be a client-server computer program in the form of a web application running in a web browser.

Processing system 20 may comprise sub-units 21-24 configured to process the medical image volume IV for providing the representation image RI and for processing the medical image volume IV using the region of interest ROI in order to generate the assistance image AI. Processing system 20 may comprise either a computer/processing unit, a microcontroller or an integrated circuit. Alternatively, processing system 20 may comprise a real or virtual group of computers like a so called 'cluster' or 'cloud'. The server system may be a central server, e.g., a cloud server, or a local server, e.g., located on a hospital or radiology site. Further, processing system 20 may comprise a memory such as a RAM for temporally loading the medical image volume IV form medical image system 40 for further processing. Alternatively, such memory may as well be comprised in user interface 10.

Sub-unit 21 is an image processing module. It is configured to provide the representation image RI on the basis of the medical image volume IV. If the medical image volume IV comprises a stack of sequential images SI, the representation image RI may, for instance, be a particular sequential image SI selected by the user. Otherwise, the user may select a preferred slice through the medical image volume IV and the image processing module (sub-unit 21) may be configured to generate the representation image RI on that basis. Sub-unit 21 is further configured to define a plurality of image patches P in the medical image volume IV. To this end, sub-unit 21 may be configured to run or execute a sliding window algorithm or an algorithm for partitioning an image into image patches P, e.g., by applying an image grid. These algorithms are generally performed for several sequential images SI or consecutive slices through the medical image volume IV—so that a three-dimensional array of image patches P results. In the sliding window approach, a window "slides" over an image for dividing it into image patches P. Every slide, the window is moved a specific number of pixels to the side, which is also called "the stride". The stride may be such that subsequent windows may comprise some overlap with one another. In general, the algorithms being executed on sub-unit 21 may be configured such that the patch size approximately corresponds to the size of the region of interest ROI, e.g., by adapting the window and/or grid size to the size of the region of interest ROI. Further, the image processing module (sub-unit 21) may be configured to generate a segmentation mask for the medical image volume IV. The segmentation mask may delineate a segment of the medical image volume IV which is relevant for the analysis form regions of the medical image volume which are less relevant. To give an example, the user may want to focus on a particular anatomical structure for analysis such as the lung lobes. Surrounding structures, albeit also visible in the medical image volume (such as the heart or the spine), are less relevant and might even obscure the further analysis. To generate the segmentation mask, image processing module 21 may be configured to segment the medical image volume IV using, for instance, a trained neural network or, in particular, a convolutional neural network.

Sub-unit 22 is a feature generation module configured to process the region of interest ROI as well as the image patches P to generate or extract a respective feature signature $f_{ROI}$, $f_P$. Therefore, sub-unit 22 is especially configured to execute or run a feature extraction algorithm for performing the step of generating the feature signature $f_{ROI}$, $f_P$. The feature extraction algorithm may be a machine-learning algorithm or an algorithm for histogram-based texture characterization, for instance. The feature signatures $f_{ROI}$, $f_P$ may be in the form of feature vectors.

Sub-unit 23 is a pattern matching module configured to compare the feature signature $f_{ROI}$ generated for the ROI with the feature signatures $f_P$ of the image patches P and to calculate a degree of similarity S for each image patch P on that basis. The degree of similarity S indicates the degree of similarity each image patch P has with respect to the region of interest ROI (on the basis of the extracted feature signatures $f_{ROI}$, $f_P$). Accordingly, sub-unit 23 is configured to run or execute a pattern matching algorithm, e.g., by calculating the dot product of the feature vectors or by evaluating histogram interaction kernels. According to some examples, the degrees of similarity S for each image patch P take the form of a three-dimensional similarity array M, with the x, y and z coordinates designating the image patch-position in the medical image volume IV.

Further, sub-units 22 and 23 may be configured to constrict the processing steps to predetermined segments of the medical image volume IV within the segmentation mask. In other words, sub-units 22 and 23 may be configured to apply a segmentation such that no further processing is performed for image patches P outside of the segments of interest leaving, for instance, the respective spots in the similarity array M void.

Sub-unit 24 is a visualization module configured to translate or convert the calculated degrees of similarity S into a suitable representation for displaying to the user. The suitable representation can be in the form of an assistance image AI in which the degrees of similarity S for each image patch P are visually encoded. Sub-unit 24 may be configured to run or execute an algorithm for generating a projection of the degrees of similarity S onto the plane of the representation image RI, the sides of the medical image volume IV or any other plane. Further, sub-unit 24 may be configured to run or execute an algorithm for creating an overlay image to be superimposed over the representation image RI or any other sequential image SI, slice or two-dimensional rendering of the medical image volume IV. As such, the overlay may, in some examples, include information from the respective sequential images or slices only. Alternatively, the overlay image may aggregate information from neighboring images or slices in the form of a projection. Sub-unit 24 may be configured to execute or run a visualization algorithm for converting the similarity array M into a two-dimensional rendering with visual indications of the degrees of similarity S. In this regard, sub-unit 24 may be configured to imply known volumetric rendering procedures, such as volume ray casting, splatting, shear wrapping or texture mapping. Further, the visualization algorithm may be configured to output the degrees of similarity S in the form of a color coding, such as a heat map. Since the calculated degrees of similarity S are based on the image patches P and not on the individual pixels/voxels of medical image volume IV, the similarity array M is usually coarser or sparser than the medical image volume IV. To make up for this effect, the visualization algorithm may be configured to upscale or "inflate" any visual representation of the degrees of similarity S, e.g., to match the size of the medical image volume IV. The visualization algorithm may further be configured to smooth or interpolate the degrees of similarity S over the image patches P by applying known smoothing or interpolating algorithms.

The designation of the distinct sub-units 21-24 is to be construed by ways of example and not as limitation. Accordingly, sub-units 21-24 may be integrated to form one single unit or can be embodied by computer code segments configured to execute the corresponding method steps running on a processor or the like of processing system 20. The same holds true with respect to interface computing unit 13. Each sub-unit 21-24 and interface computing unit 13 may be individually connected to other sub-units and or other components of the system 1 where data exchange is needed to perform the method steps. For example, sub-unit 21 may be connected to the medical image system 40 for retrieving the medical image volume IV and/or to interface computing unit 13 for forwarding/showing the representation image RI to the user via user interface 10. As an alternative or in addition to that, interface computing unit 13 may be directly connected to medical image system 40 for retrieving the medical image volume IV.

Medical image system 40 is generally configured for acquiring and/or storing and/or forwarding medical image volumes IV. For instance, medical image system 40 may comprise an archive/review station 41 for storing medical image volumes IV. Archive/review station 41 may be realized as a cloud storage. Alternatively, archive/review station 41 may be realized as a local or spread storage, e.g., as a PACS (Picture Archiving and Communication System). Archive/review station 41 may further store further clinical information related to the medical image volumes IV, wherein the clinical information may comprise, e.g., related medical findings, personal information related to the patient under consideration, patient records or the like. Alternatively, a further database (not shown) may store this related information. Further, medical image system 40 may comprise a medical imaging modality 42, such as a computed tomography system, a magnetic resonance system, an angiography (or C-arm X-ray) system, a positron-emission tomography system, a mammography system, system for acquiring digital pathology images or the like.

Individual components of system 1 may be at least temporarily connected to each other for data transfer and/or exchange. User interface 10 communicates with processing system 20 via interfaces to exchange, e.g., the medical image volume IV, the defined region of interest ROI, the degrees of similarity S, or the assistance image AI. For example, processing system 20 may be activated on a request-base, wherein the request is sent by user interface 10. Further, processing system 20 may communicate with medical image system 40. As an alternative or in addition to that, user interface 10 may communicate with medical image system 40 directly. Medical image system 40 and, in particular, archive/review station 41, may likewise be activated on a request-base, wherein the request is sent by processing system 20 and/or user interface 10.

An interface for data exchange may be realized as hardware- or software-interface, e.g., a PCI-bus, USB or firewire. A computing or processing unit may comprise a hard-ware or software component, e.g., a micro-processor or a FPGA ('Field Programmable Gate Array'). A storage unit, e.g., a database, may be realized as Random-Access Memory (RAM), as durable mass storage (hard drive, solid state disk or the like).

Data transfer optionally is realized using a network connection. The network may be realized as local area network (LAN), e.g., an intranet or a wide area network (WAN). Network connection is optionally wireless, e.g., as wireless LAN (WLAN or Wi-Fi). Further, the network may comprise a combination of different network examples.

Specifically, the network may comprise a network compatible with the DICOM-standard (Digital Imaging and Communications in Medicine) and the retrieval of the medical image volumes IV may be carried out by a DICOM query and retrieve application class. Likewise, archiving the assistance image AI in medical image system 40 may be carried out using the DICOM query and retrieve application class.

Processing system 20 and interface computing unit 13 together comprise a computing unit 30 (including at least one processor and/or processing circuitry). Of note, the layout of computing unit 30, i.e., the physical distribution of interface computing unit 13 and sub-units 21-24 is, in principle, arbitrary. For instance, sub-unit 24 (or individual elements of it or specific algorithm sequences) may likewise be localized in user interface 10. The same holds true for the other sub-units 22-24. Specifically, processing system 20 may also be integrated in user interface 10. As already mentioned, processing system 20 may alternatively be embodied as a server system, e.g., a cloud server, or a local server, e.g., located on a hospital or radiology site. In this constellation, user interface 10 could be designated as "frontend" or "client" facing the user, while processing system 20 could then be conceived as "backend" or server. Communication between user interface 10 and processing system 20 may be carried out using the https-protocol, for instance. The computational power of the system may be distributed between the server and the client (i.e., user interface 10). In a "thin client" system, the majority of the computational capabilities exists at the server. In a "thick client" system, more of the computational capabilities, and possibly data, exist on the client.

Figure 2:
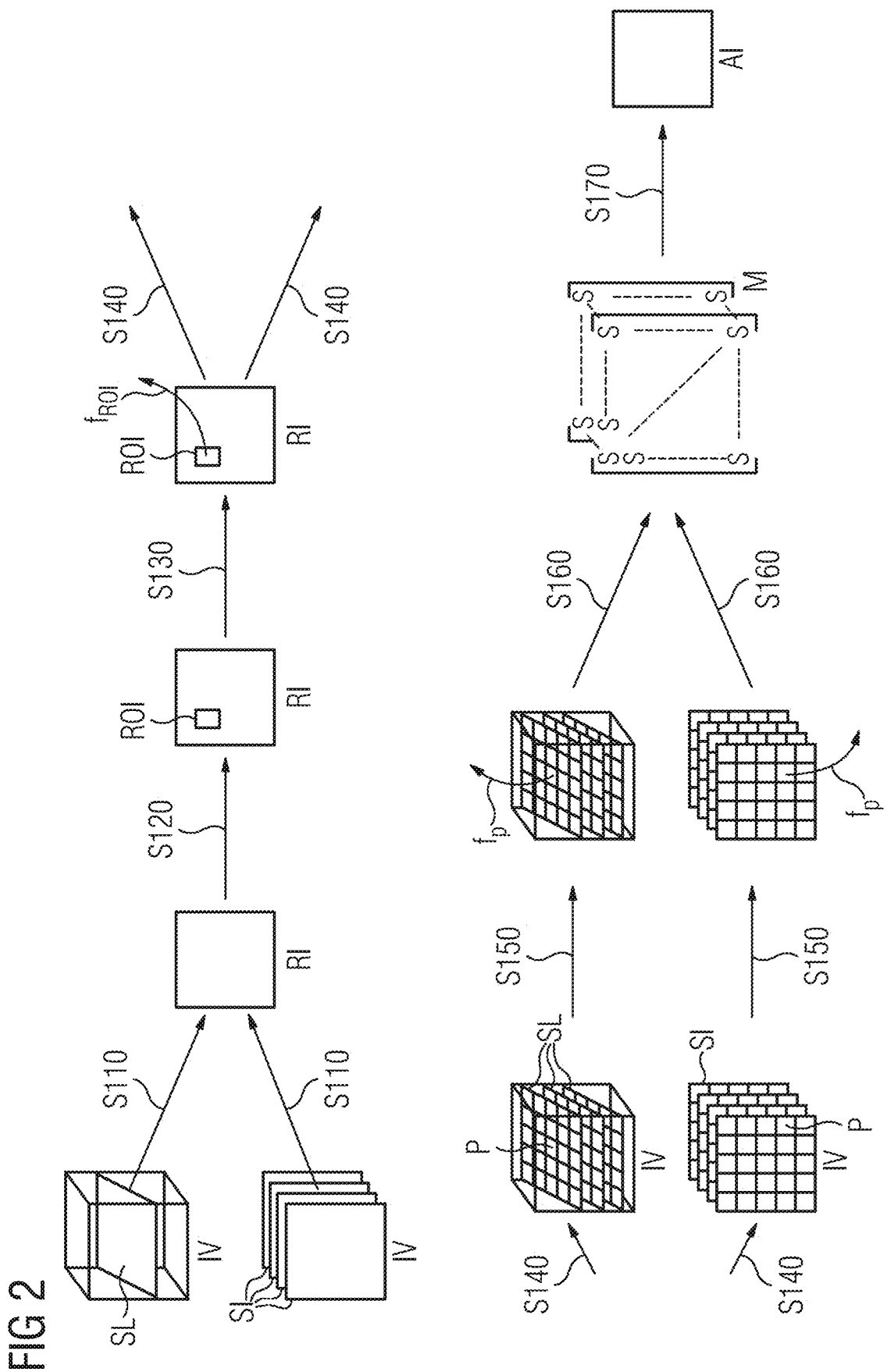
FIG. 2 depicts a flowchart illustrating a method for quantifying medical images.

FIG. 2 depicts a method for quantifying a medical image volume IV according to an embodiment. The method comprises several steps. The order of the steps does not necessarily correspond to the numbering of the steps but may also vary between different embodiments.

A first step S110 is directed to provide the two-dimensional representation image RI for defining the region of interest ROI. The representation image is selected from the medical image volume IV either by the user or automatically by computing unit 30 or semi-automatically, i.e., assisted by computing unit 30. To allow the user to select the representation image RI, step S110 may comprise providing a suitable graphical user interface in user interface 10. If the medical image volume IV comprises a stack of sequential images SI, the graphical user interface may be configured such that the user may scroll through the sequential images SI and the actually selected sequential image SI is displayed as the representation image RI of the medical image volume IV. If the medical image volume IV is a three-dimensional array of image data lacking defined sequential images SI, the graphical user interface may be configured such that the user can define an arbitrary plane slicing ("slice") through the medical image volume IV. Based on this slice, system 1 may then be configured to calculate the representation image RI, e.g., by projecting image points of the medical image volume IV neighboring the slice onto the slice using known techniques. Further, system 1 may also be configured, to also apply the process of providing the representation image RI by way of an arbitrarily defined slice to medical image volumes IV comprising a stack of sequential images SI. Prior to providing the representation image RI, step S110 may comprise the optional step of loading the medical image volume IV. The medical image volume IV may, for instance, be selected by the user. To this end, user interface 10 may be configured to produce a user interface that allows the user to select a given medical image volume IV, e.g., form archive/review station 41. Alternatively, the medial image volumes IV may be directly forwarded from medical imaging modality 42. The medical image volume IV may be loaded into a suitable memory of either user interface 10 or processing system 20. Step S110 may be performed at least partially either on user interface 10 or on processing system 20. Corresponding data exchange is included in this step where necessary.

A second step S120 is directed to defining a region of interest ROI in the representation image RI. The defining of the region of interest ROI is carried out manually by a user or may, alternatively, be conducted automatically or semi-automatically. Manual and semi-automatic definition of the region of interest ROI comprise displaying of the representation image RI via a graphical user interface—optionally of user interface 10. The user may, e.g., position a region of interest tool visualized for the user as overlay to the displayed representation image RI. Optionally, further adaptation of size and/or shape of the tool may follow. As an alternative or in addition to that, the definition of the region of interest ROI may include a free hand selection of the region of interest, e.g., by retracing the contour of the region of interest ROI using any suitable input unit 12. The definition of the region of interest ROI is based on identifying a feature in the representation image RI. This may be an anatomical feature indicative of a pathological condition of the patient. Here, in other words, position, size and shape of the region of interest ROI optionally depend on an abnormal or atypical feature present in the representation image RI. The abnormal feature may correspond to any deviation of an anatomical structure, organ or tissue like lung, heart, vessels, brain, e.g., increased or lowered local tissue density, cysts, calcifications or the like. The atypical anatomical features thus represent a pathological condition of the patient. Moreover, the feature may relate to a feature in a pathology image or pathological feature. The feature may either be visually inspected or identified by the radiologist/pathologist or may be result of a feature extraction and/or object detection step optionally comprised in this step S120. Thus, step S120 may be performed at least partially either on user interface 10 or on processing system 20. Corresponding data exchange is included in this step where necessary.

A third step S130 is directed to generating a feature signature $f_{ROI}$ for the region of interest ROI defined in the representation image RI. In other words, Step S130 uses an image discriminator to transform raw image intensities of the region of interest ROI to numerical representations (the feature signature) better suited for mathematically extracting the similarity to other image patches P of the medical image volume IV. Step S130 is optionally performed on processing system 20 of system 1. The feature signature $f_{ROI}$ may comprise numerous features which as a sum characterize the analyzed region of interest ROI. For instance, the feature signature $f_{ROI}$ may comprise texture features, shape features, intensity/density features, color or grey scale features, size features, structural features, or localization features. The feature extraction according to Step S130 may rely on corner detection or may be performed using histogram-based feature extraction such as histogram of oriented gradients (HOG), Cooccurrence histogram of oriented gradients (Co-HOG), Cooccurrence vector of oriented gradients (CVOG), shape histogram feature extraction (SFHE) or the like. Further, step S130 may be performed using a trained machine-learning algorithm, optionally a neural network. In that case, the feature signature $f_{ROI}$ of the region of interest ROI may be represented by the output values of the last but one layer of the neural network. Thus, the neural network performs at least one, optionally more of the following operations on the region of interest ROI and/or the representation image RI: analysis and/or measurement of objects, local and/or global structure and/or texture analysis. If a neural network is used for the extraction of the feature signature $f_{ROI}$, the same neural network may be used for the (optional) automatic or semi-automatic definition of the region of interest and/or the definition of image patches P in the medical image volume IV and/or the optional generation and appliance of the segmentation mask. The individual features of the region of interest ROI may be integrated in a feature vector. The feature signature $f_{ROI}$ of the region of interest ROI is local in the sense that it describes the features extracted from the region of interest ROI. However, when generating the feature signature $f_{ROI}$ also information may be processed going beyond the region of interest ROI, e.g., the location of the region of interest ROI with respect to anatomic structures or parameters globally characterizing the representation image RI and/or the medical image volume IV. For instance, the algorithms used to extract the feature signatures can be adapted to the image modality used for acquiring the medical image volume IV in the first place or to the body part under consideration. Accordingly, step S130 may further comprise acquiring an imaging parameter for the representation image RI and/or the medical image volume IV being indicative of the imaging modality used and/or the body part under consideration. Thus, Step S130 may further comprise image analysis involving optical character recognition (OCR) techniques and/or semantic analysis to deduce the corresponding information. Moreover, Step 130 may comprise querying a suitable database for additional information associated with the medical image volume IV. Step S130 may be performed at least partially either on user interface 10 or on processing system 20. Corresponding data exchange is included in this step where necessary. Optionally, step S130 is performed in processing system 20.

A fourth step S140 is directed to defining a plurality of image patches P within the medical image volume IV. The image patches P may be rectangular or quadratic. The image patches P may be of approximately the same size as the region of interest ROI. Therefore, step S140 may comprise the optional step of defining the size of the image patches P on the basis of the region of interest ROI and, optionally, in a way that the image patches P have approximately the same size as the region of interest ROI. To this end, a bounding box around the region of interest ROI may be defined which contains the contour of the region of interest (into which the contour of the region of interest ROI is inscribed). The bounding box may be rectangular or quadratic. The image patch size may then be adjusted such that it approximately corresponds to the size of the bounding box. In other words, the image patches P may have the form of a bounding box into which the region of interest ROI is inscribed. The image patches P are defined in the representation image RI and, additionally, in image planes or slices of the medical image volume IV which are parallel to the plane of the representation image RI. If the medical image volume IV comprises a stack of sequential images SI, the image patches P may be defined in all or part of the sequential images SI contained in the medical image volume IV. If the medical image volume IV does not comprise defined sequential images SI and/or if the representation image RI has been provided as an arbitrary slice through the medical image volume IV, step S140 may comprise the additional step of generating a plurality of slices SL through the medical image volume that are parallel to the plane of the representation image. Subsequently, the image patches P are defined in the slices SL as well. The number of slices SL generated as well as the number of sequential images SI considered for defining additional image patches P in planes parallel to the representation image RI may be adjusted either by the user or automatically by system 1 according to the desired resolution of the quantification. For obtaining the best resolution, all sequential images SI can be used, for instance. The actual definition of the image patches P may comprise partitioning the representation image RI, the slices SL and/or the sequential images SI by applying a grid, wherein the grid size defines the desired image patch size. Alternatively, the image patches P may be defined using a sliding window algorithm with or without overlapping windows. As the window size defines the patch size, the windows may be of a similar size as the region of interest ROI (or the bounding box around the region of ROI). Likewise, the grid size may be of approximately the same size as the size of the region of interest. At the end of step S140, a three-dimensional array of two-dimensional image patches P may be obtained, which image patches P are three-dimensionally distributed in the medical image volume IV. If the image patches P are regularly spaced in the three spatial directions, the resulting array of image patches P is also regular in the three spatial directions. Step S140 may be performed at least partially either on user interface 10 or on processing system 20. Corresponding data exchange is included in this step where necessary. Step S140 may be performed in processing system 20.

A fifth step S150 is directed to generating a feature signature $f_P$ for each of the image patches P. Optionally, the feature signatures $f_P$ for the image patches P have the same format as the format of the feature signature of the region of interest $f_{ROI}$. Accordingly, Step S150 may rely on the same image discriminator as in step S130, meaning that the generation of the feature signatures $f_P$ for the image patches P may involve the same steps and invoke the same algorithms as the generation of the feature signature $f_{ROI}$ of the region of interest ROI. Like in the case of the feature signature $f_{ROI}$ of the region of interest ROI, the feature signatures $f_P$ of the image patches P may take the form of a feature vector. At the end of step S150, an array or matrix of feature signatures may be obtained comprising a feature signature $f_P$ for each image patch P. The array of feature signatures has the same dimensions as the array of image patches P obtained at the end of step S140. Step S150 may be performed at least partially either on user interface 10 or on processing system 20. Corresponding data exchange is included in this step where necessary. Step S150 may be performed in processing system 20.

Further, step S150 may comprise the optional step of applying a segmentation mask (not shown) before generating the feature signatures $f_P$, so that feature signatures $f_P$ are only generated for image patches P within the segmentation mask. This saves computation time in step S150 and the subsequent steps. Alternatively, the segmentation mask can already be applied in the preceding step S140, such that image patches P are only defined within the segmentation mask in the first place. Further, the segmentation mask may also be applied in the subsequent step S160 only so that degrees of similarity S are only generated for image patches P within the segmentation mask. The application of the segmentation mask may lead to an array M of degrees of similarity S having voids in places outside of the segmentation mask. The segmentation mask may be generated by an (optional) segmentation step.

A sixth step S160 is directed to calculate, for each image patch P, a degree of similarity S between the respective image patch P and the region of interest ROI. To this end, the feature signature $f_P$ for each image patch P is compared to the feature signature $f_{ROI}$ of the region of interest ROI. Mathematically this can be done by calculating the dot product (also referred to as cosine similarity) between the feature signatures $f_P$ (feature vectors) of the image patches P and the feature signature $f_{ROI}$ (feature vector) of the region of interest ROI. If feature histograms are involved, the respective degrees of similarity S may also be calculated by determining the histogram intersection kernel between the feature signatures $f_P$ of the image patches P and the feature signature $f_{ROI}$ of the region of interest ROI. At the end of step S150, a three-dimensional array M is obtained comprising a degree of similarity S for each image patch P. Step S160 may be performed at least partially either on user interface 10 or on processing system 20. Corresponding data exchange is included in this step where necessary. Step S160 may be performed in processing system 20.

For the sake of easy reference, steps S140, S150, and S160 have been explained as separate steps. These steps may as well be interlinked, however, in the sense that once an image patch P is defined, e.g., by a stride of the sliding window, its feature signature $f_P$ is generated and its degree of similarity with the region of interest ROI is calculated at once before advancing to next image patch P. The resulting three-dimensional array M of degrees of similarity S is the same. However, the intermediate arrays of image patches P and feature signatures $f_P$ are not calculated as such. Of note, this procedure is also within the scope of the appended claims, since it likewise involves defining a plurality of image patches P, generating a feature signature for each image patch P and calculating a degree of similarity S for each image patch P as required in the claims.

A seventh step S170 is directed to visualize the degrees of similarity S for the user. In general, this may involve generating a two-dimensional assistance image AI for the user which can then be transmitted to user interface 10 for reviewing. The assistance image AI may be a two-dimensional rendering of the array M of degrees of similarity S using known volumetric rendering techniques such as ray-tracing or ray-casting or the like. In this regard, the user may specify parameters such as the viewing angle or the viewing distance. Optionally, this can be done in an interactive manner via user interface 10 with the help of a suited graphical user interface. Moreover, if the medical image volume IV comprises a stack of sequential images SI, the degrees of similarity S may be selectively displayed for each of the sequential images SI. If the user scrolls to a particular sequential image SI, the system may be configured to retrieve the corresponding degrees of similarity S an translate them into a suitable assistance image AI. The same scheme may be applied for arbitrary slices through the medical image volume IV. Alternatively, the assistance image AI may be obtained by projecting the degrees of similarity S (which are, in general, a three-dimensional array) onto an image plane of medical image volume IV (e.g., the image plane of the representation image RI). This projection may, for instance, take the form of a maximum intensity projection. Further, the assistance image AI may be configured as a semi-transparent overlay image which can be superimposed on an original image, such as the representation image RI or any other two-dimensional rendering of the medical image volume IV, for instance. Especially as regards the generation of an overlay image, the assistance image AI may be adapted appropriately so as to conform to the size of the underlying original image. In general, the information pertaining to the degrees of similarity S may be visually encoded in the assistance image, for instance, in the form of a color-coding or heat map. To this end, a color gradient having a given color spectrum may be assigned to the degrees of similarity S so that high degrees of similarity S are associated with one end of the color spectrum and low degrees of similarity S are associated to the other end of the color spectrum. Optionally, step S170 may comprise a step of smoothing or interpolating the degrees of similarity S for visualization. Further, the visualization may optionally be constricted to display degrees of similarity S above a predetermined threshold only. With that, it can be prevented that the visualization is obscured with image patches P that are only remotely similar to the region of interest ROI. Degrees of similarity S beneath a given threshold may then be shown as transparent spots in the assistance image AI, for instance. Further, the segmentation mask may as well be applied to the assistance image AI so that only degrees of similarity S within the segmentation mask are considered for the further visualization. Degrees of similarity S for image patches P outside of the segmentation mask may be shown as transparent spots or covered by a suitable masking, for instance. Step S170 may be performed at least partially either on user interface 10 or on processing system 20. Corresponding data exchange is included in this step where necessary. Optionally, step S170 is performed in processing system 20.

System 1 may provide an option to forward the assistance image AI and/or the calculated degrees of similarity S to medical image system 40 for archiving the results of the image volume quantification together with the medical image volume IV. Optionally, the system is configured such that the user has to actively decide whether or not he wants the evaluation results to be archived. This can be realized by a corresponding button in the graphical user interface running in user interface 10, for instance.

Wherever meaningful, individual embodiments or their individual aspects and features can be combined or exchanged with one another without limiting or widening the scope of the present invention. Effects which are described with respect to one embodiment of the present invention are, wherever applicable, also advantageous to other embodiments.

What is claimed is:

1. A method for quantifying a three-dimensional medical image volume comprising:
   providing a two-dimensional representation image based on the three-dimensional medical image volume;
   defining a region of interest in the two-dimensional representation image;
   generating a feature signature for the region of interest;
   defining a plurality of two-dimensional image patches in the three-dimensional medical image volume;
   calculating, for each of the plurality of two-dimensional image patches, a degree of similarity between the region of interest and the respective image patch based on the feature signature; and
   visualizing the degrees of similarities, wherein
   the three-dimensional medical image volume contains a stack of two-dimensional sequential images,
   the step of providing the two-dimensional representation image comprises selecting one of the two-dimensional sequential images as the two-dimensional representation image, and
   the step of defining of the plurality of two-dimensional image patches comprises defining a plurality of image patches in each of the two-dimensional sequential images.

2. The method of claim 1, wherein
   in the step of defining the plurality of image patches, a size of the image patches is defined based on a size of the region of interest.

3. The method of claim 1, wherein the step of generating the feature signature for the region of interest is performed using a trained machine-learning algorithm.

4. The method of claim 1, wherein
   the step of visualizing the degrees of similarities comprises generating a two-dimensional rendering based on the degrees of similarity.

5. The method of claim 1, wherein
the defining of the region of interest is carried out manually by a user.

6. The method of claim 1, wherein
the step of providing the two-dimensional representation image comprises selecting the two-dimensional representation image from the three-dimensional medical image volume manually by a user.

7. The method of claim 1, wherein
the degrees of similarity span the three-dimensional medical image volume in three dimensions.

8. The method of claim 1, further with the steps of:
generating a segmentation mask for the three-dimensional medical image volume; and
applying the segmentation mask in the step of defining the plurality of two-dimensional image patches so that image patches are only defined inside the segmentation mask.

9. The method of claim 1, further with the steps of:
generating a segmentation mask for the three-dimensional medical image volume; and
applying the segmentation mask in the step of calculating the degrees of similarity so that degrees of similarities are only calculated for image patches inside of the segmentation mask.

10. The method of claim 1, further with the steps of:
generating a segmentation mask for the three-dimensional medical image volume; and
applying the segmentation mask in the step of visualizing the degrees of similarity so that only degrees of similarity for image patches inside of the segmentation mask are being visualized.

11. The method of claim 1, wherein, in the step of visualizing the degrees of similarity, the degrees of similarity are visualized using a color-code.

12. The method of claim 1, wherein
the defining of the region of interest is based on identifying an anatomical feature in the two-dimensional representation image, and wherein the anatomical feature is indicative of a pathological condition of a patient.

13. The method of claim 1, further comprising the step of comparing the degrees of similarity to a threshold,
wherein, in the step of visualizing the degrees of similarity, only degrees of similarity above the threshold are visualized.

14. A method for quantifying a three-dimensional medical image volume comprising:
providing a two-dimensional representation image based on the three-dimensional medical image volume;
defining a region of interest in the two-dimensional representation image;
generating a feature signature for the region of interest;
defining a plurality of two-dimensional image patches in the three-dimensional medical image volume;
calculating, for each of the plurality of two-dimensional image patches, a degree of similarity between the region of interest and the respective image patch based on the feature signature; and
visualizing the degrees of similarities, wherein
the step of calculating the degrees of similarity comprises, for each image patch, generating a feature signature for the respective image patch and comparing it to the feature signature of the region of interest.

15. The method of claim 14, wherein
the step of generating the feature signatures for each of the plurality of two-dimensional image patches is performed using a trained machine-learning algorithm.

16. A method for quantifying a three-dimensional medical image volume comprising:
providing a two-dimensional representation image based on the three-dimensional medical image volume;
defining a region of interest in the two-dimensional representation image;
generating a feature signature for the region of interest;
defining a plurality of two-dimensional image patches in the three-dimensional medical image volume;
calculating, for each of the plurality of two-dimensional image patches, a degree of similarity between the region of interest and the respective image patch based on the feature signature; and
visualizing the degrees of similarities, wherein
the step of visualizing the degrees of similarities comprises:
generating a semi-transparent two-dimensional rendering based on the degrees of similarity, and
overlaying the semi-transparent two-dimensional rendering over a corresponding two-dimensional rendering of the three-dimensional medical image volume.

17. A system for quantifying a three-dimensional medical image volume, comprising:
an interface configured to,
provide a two-dimensional representation image based on the three-dimensional medical image volume; and
at least one processor configured to cause the system to,
define a region of interest in the two-dimensional representation image, generate a feature signature for the region of interest,
define a plurality of two-dimensional image patches in the three-dimensional medical image volume,
calculate, for each of the plurality of two-dimensional image patches, a degree of similarity between the region of interest and the respective image patches based on the feature signature, and
visualize the degrees of similarities, wherein
the three-dimensional medical image volume contains a stack of two-dimensional sequential images,
the at least one processor is further configured to cause the system to provide the two-dimensional representation image by selecting one of the two-dimensional sequential images as the two-dimensional representation image, and
the at least one processor is further configured to cause the system to define the plurality of two-dimensional image patches by defining a plurality of image patches in each of the two-dimensional sequential images.

18. A system for quantifying a three-dimensional medical image volume, comprising:
an interface configured to,
provide a two-dimensional representation image based on the three-dimensional medical image volume; and
at least one processor configured to cause the system to,
define a region of interest in the two-dimensional representation image, generate a feature signature for the region of interest,
define a plurality of two-dimensional image patches in the three-dimensional medical image volume,
calculate, for each of the plurality of two-dimensional image patches, a degree of similarity between the region of interest and the respective image patches based on the feature signature, and visualize the degrees of similarities, wherein the at least one processor is further configured to cause the system to calculate the degrees of similarity by, for each image patch, generating a feature signature for the respective image patch and comparing it to the feature signature of the region of interest.

19. A system for quantifying a three-dimensional medical image volume, comprising:

an interface configured to, provide a two-dimensional representation image based on the three-dimensional medical image volume; and at least one processor configured to cause the system to, define a region of interest in the two-dimensional representation image, generate a feature signature for the region of interest, define a plurality of two-dimensional image patches in the three-dimensional medical image volume, calculate, for each of the plurality of two-dimensional image patches, a degree of similarity between the region of interest and the respective image patches based on the feature signature, and visualize the degrees of similarities, wherein the at least one processor is further configured cause the system to visualize the degrees of similarities by generating a semi-transparent two-dimensional rendering based on the degrees of similarity, and overlaying the semi-transparent two-dimensional rendering over a corresponding two-dimensional rendering of the three-dimensional medical image volume.

* * * * *